Jan. 9, 1923.
W. G. COX.
PARALLEL BAR BUMPER.
FILED OCT. 25, 1922.
1,441,785.
2 SHEETS—SHEET 1
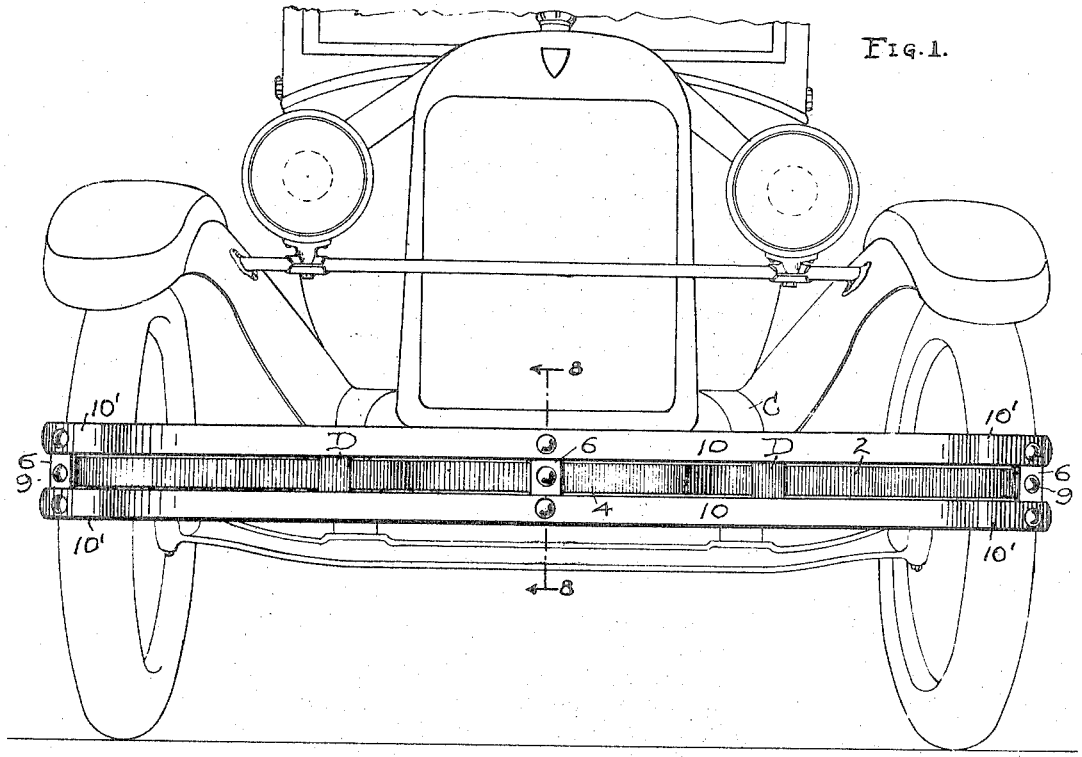
Fig. 1.
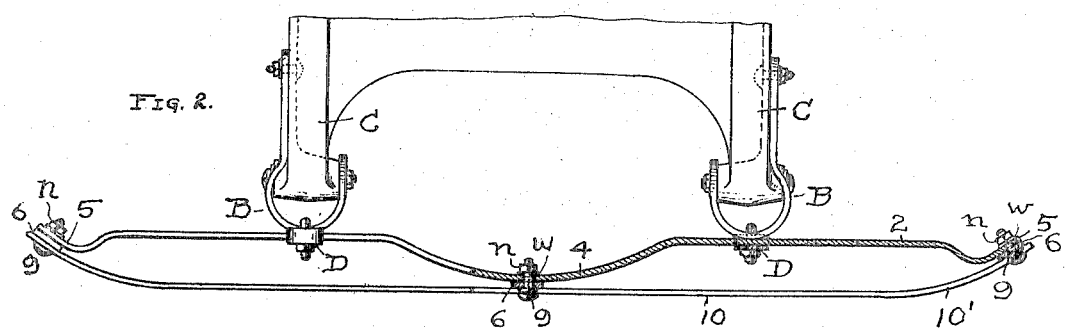
Fig. 2.
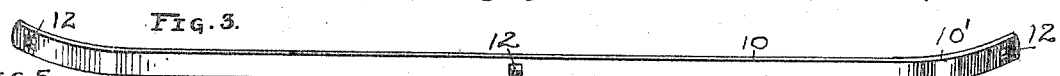
Fig. 3.
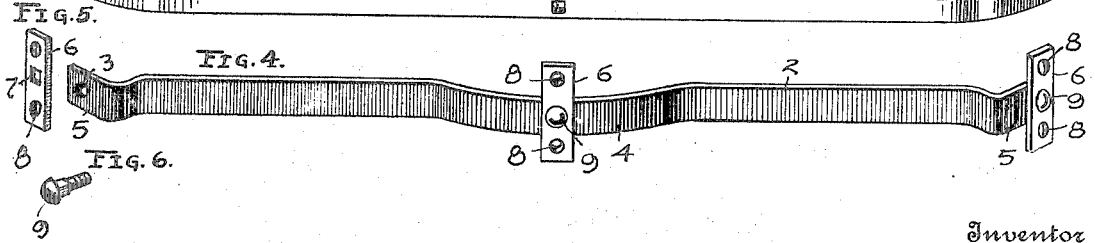
Fig. 4. Fig. 5.
Fig. 6.
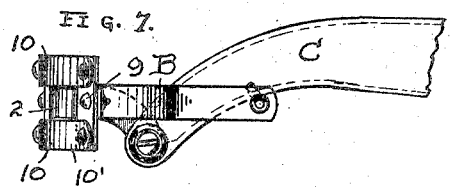
Fig. 7.
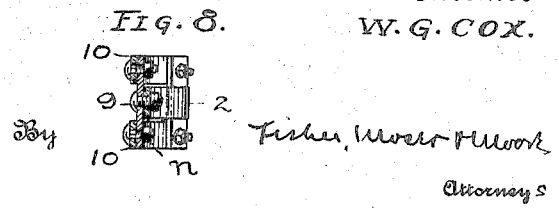
Fig. 8.
Inventor
W. G. COX.
By Fisher, Moser & Hook
Attorneys Fig. 9.
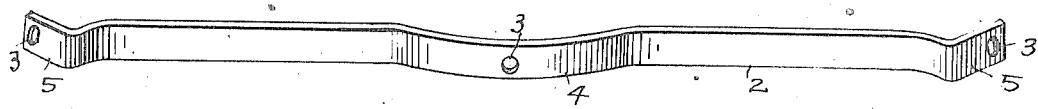
Fig. 10
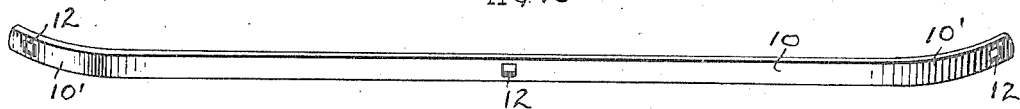
Fig. 11
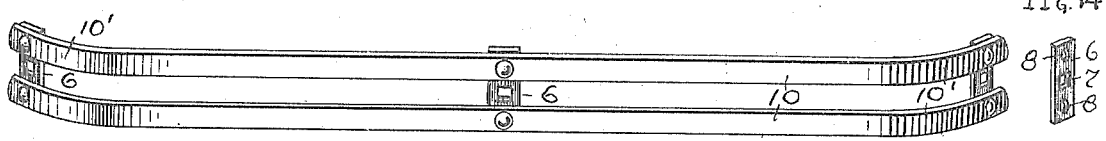
Fig. 14
Fig. 12
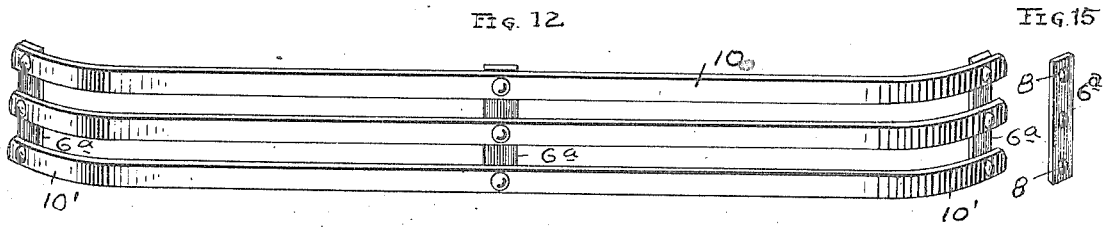
Fig. 15
Fig. 13
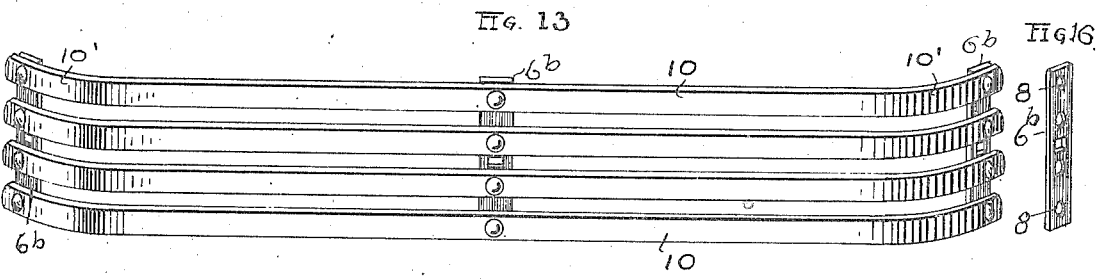
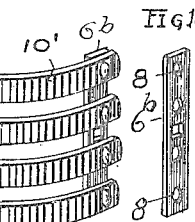
Inventor
W. G. COX.

Patented Jan. 9, 1923.

1,441,785

UNITED STATES PATENT OFFICE.

WILLIAM G. COX, OF CLEVELAND, OHIO, ASSIGNOR TO COX BRASS MANUFACTURING COMPANY, OF ALBANY, NEW YORK, A CORPORATION OF NEW YORK.

PARALLEL-BAR BUMPER.

Application filed October 25, 1922. Serial No. 596,720.

*To all whom it may concern:*

Be it known that I, WILLIAM G. COX, a citizen of the United States, residing at Cleveland, in the county of Cuyahoga and State of Ohio, have invented certain new and useful Improvements in Parallel-Bar Bumpers, of which the following is a specification.

This invention relates to parallel bar bumpers, and the object is to provide a simple and inexpensive form of separable and convertible bumper in which complementary parts are used and united in a particular way to permit assembly, disassembly, alterations, repairs and replacements to be made with expedition and despatch and to permit the impact area of the bumper to be made wider or narrower vertically to conform to different conditions and requirements in different vehicles or because of the demands, preferences or requirements exacted by dealers or the ultimate user.

In the drawings accompanying this application Fig. 1 is a front view of my improved parallel bar bumper mounted at the front end of an automobile, and Fig. 2 is a top plan view thereof, partly in section. Fig. 3 is a perspective view of an impact bar and Fig. 4 is a similar view of the supporting bar. Fig. 5 is a perspective view of one of the vertical straps or plates separated from the supporting bar, and Fig. 6 is a perspective view of a carriage bolt used to detachably unite the bumper parts together. Fig. 7 is a side elevation of the double-bar bumper shown in Fig. 1, and Fig. 8, is a vertical section of the bumper alone on line 8—8 of Fig. 1. Fig. 9 is a perspective view of the supporting bar without the detachable vertical plates, and Fig. 10 is a perspective view of a single impact bar as it appears detached from said rear bar. Figs. 11, 12 and 13 are perspective views of double bar, triple bar and quadruple bar impact units, respectively, and Figs. 14, 15 and 16 are perspective views of the straps or plates used to produce these respective impact units.

The present bumper is particularly designed to eliminate loops and similar reverse bends, the formation of eyes, and other involved bending operations either slow or difficult of operation of which require the use of expensive dies and machines. Thus in making the bumper a rear bar 2 is cut to a given length from a straight flat strip of steel, and three round bolt openings 3 are punched therein, one at the middle of the bar and one relatively near each end thereof. The bar is also bowed outwardly at its middle 4 and the opposite ends are curved forwardly and thence rearwardly to provide short diverging or slanting extremities 5 having flat faces in which the openings 3 are located. The next step in operation is to provide the complementary flat pieces or plates 6 having a plurality of bolt openings therein, preferably one square opening 7 mid-length thereof and one or more round openings 8 in the respective halves of each piece at equi-distant places from the central square opening 7. The pieces or plates 6 are relatively narrow and long with the openings located on the longitudinal median line in the flat face thereof, and these pieces may be made of the same bar stock as bar 2. In construction the bumper, corresponding pieces 6 are detachably bolted to the flat front face of bar 2, one bolt at its middle and one at each end where the bolt holes 3 are situated, using short carriage bolts 9, nuts $n$ and lock washers $w$, for that purpose, see Figs. 2 and 4. The bolts are inserted through the middle opening 7 in the short pieces 6 and when the three pieces are clamped in place they extend parallelly and vertically across horizontal bar 2 with the opposite halves thereof projecting equal distances above and below the bar, and with the two flat pieces 6 attached to the diverging extremities 5 of the horizontal bar obliquely positioned in respect to the front flat face of the middle piece 6. This relationship of parts permits two or more complementary impact bars 10 having slightly curved end portions 10' to be detachably secured horizontally and parallelly in spaced relation upon the projecting ends of the short complementary pieces 6, using complementary bolts, nuts and locking washers such as described. The three openings 12 in each impact bar 10 are preferably square to receive the square shank of the carriage bolt, and when the parallel impact bars 10 are bolted to the pieces 6 such parts form a rectangular skeleton frame which is adapted to be attached to and removed bodily from supporting bar 2. This result is possible because the bolts 9 at the center of pieces 6 secure the pieces to bar 2 independently of horizontal bars 10. Thus it is feasible to remove either one or both of the impact bars 10 without removing the vertical pieces 6, or remove the two impact bars and the three vertical pieces jointly from the rear supporting bar 2. A wrench is the only tool required to accomplish the assembly and disassembly of the separable bumper, and it is a simple matter to convert the bumper. Moreover, by substituting longer pieces 6ª for the short pieces 6, a three bar bumper, or a four bar bumper may be created. This is illustrated on sheet 2 of the drawings, wherein Fig. 9 illustrates the rear supporting bar 2, and Fig. 10 a single impact bar 10. By merely using the bolts, nuts and washers, the single bar 10 may be bolted to bar 2 to produce a bumper with a single narrow impact face. By using three short pieces 6 such as shown in Fig. 14 two impact bars 10--10 may be secured thereto to produce a wider impact frame which may be detachably bolted to bar 2 instead of a single impact bar. By employing three longer pieces 6ª, see Fig. 15, a still wider impact frame composed of three impact bars 10 may be created and detachably bolted to the rear bar 2, and in Fig. 13, I show a four bar impact frame which may be constructed by bolting four bars 10 to three long complementary bars 6ᵇ such as shown in Fig. 16.

The bumper may be attached to a vehicle in any suitable or well known way, for example, a pair of brackets B may be bolted to the chassis frame C and clamping devices D used to secure the rear bar horizontally in place at the front side of said brackets as shown in Fig. 2. In case of a severe collision or impact it frequently occurs that the bumper absorbs the shock by yielding or surrendering to such an extent in some part thereof that one or more of the bars will be badly bent or even broken. This is partly the function of a bumper as it is better to injure the bumper than the car, and therefore, the present bumper is constructed as described to permit a bent or broken part to be easily removed and repaired or replaced at a small cost and to permit a change or alteration to be effected by unskilled persons merely by the aid of wrench. Thus, roadside repairs are not only possible but feasible, especially as everyone of the bumper parts is of simple form and easily repaired and handled.

What I claim, is:

1. A multiple bar bumper, for a vehicle, comprising a horizontal spring bar having reversely-inclined flat extremities, separate flat pieces vertically affixed flat-wise at their middle to said inclined extremities, and parallel spring bars having reversely-inclined extremities affixed flat-wise at their opposite inclined ends to said separate vertical pieces.

2. A multiple bar bumper for a vehicle, comprising a horizontal spring bar having diverging extremities provided with bolt openings, separate flat metal pieces detachably bolted at their middle vertically to said diverging extremities, and a number of parallel spring impact bars having diverging end portions independently secured to said vertical pieces and separably detachable therefrom.

3. A separable bar bumper for a vehicle, comprising a horizontal spring bar having bolt openings at opposite ends thereof, complementary flat pieces having spaced bolt openings therein, bolts and nuts and lock washers adapted to secure said pieces at their middle in a vertical position upon opposite ends of said bar, a number of straight steel bars having bolt openings at their opposite ends, and bolts and nuts and lock washers adapted to detachably fasten said steel bars independently in parallel spaced relation upon said vertical pieces equi-distantly above and below the middle thereof.

In testimony whereof I affix my signature hereto.

WILLIAM G. COX.